Figure 1:
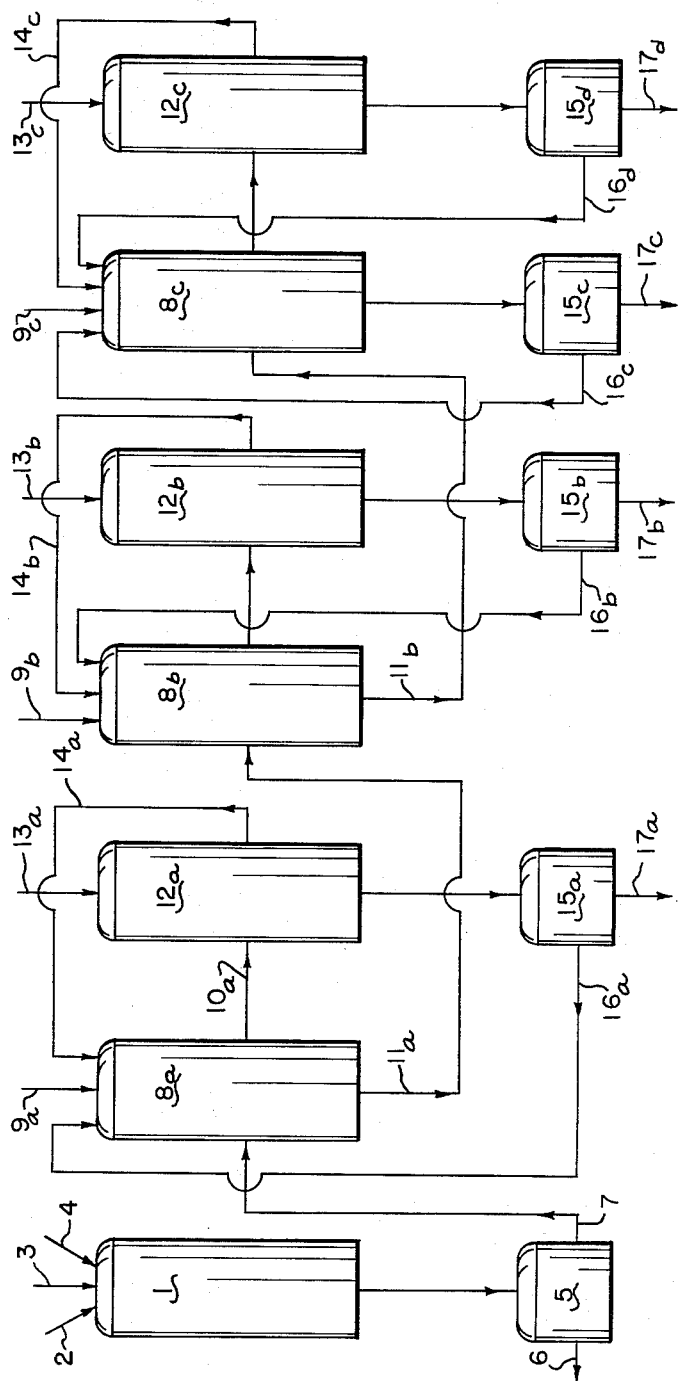

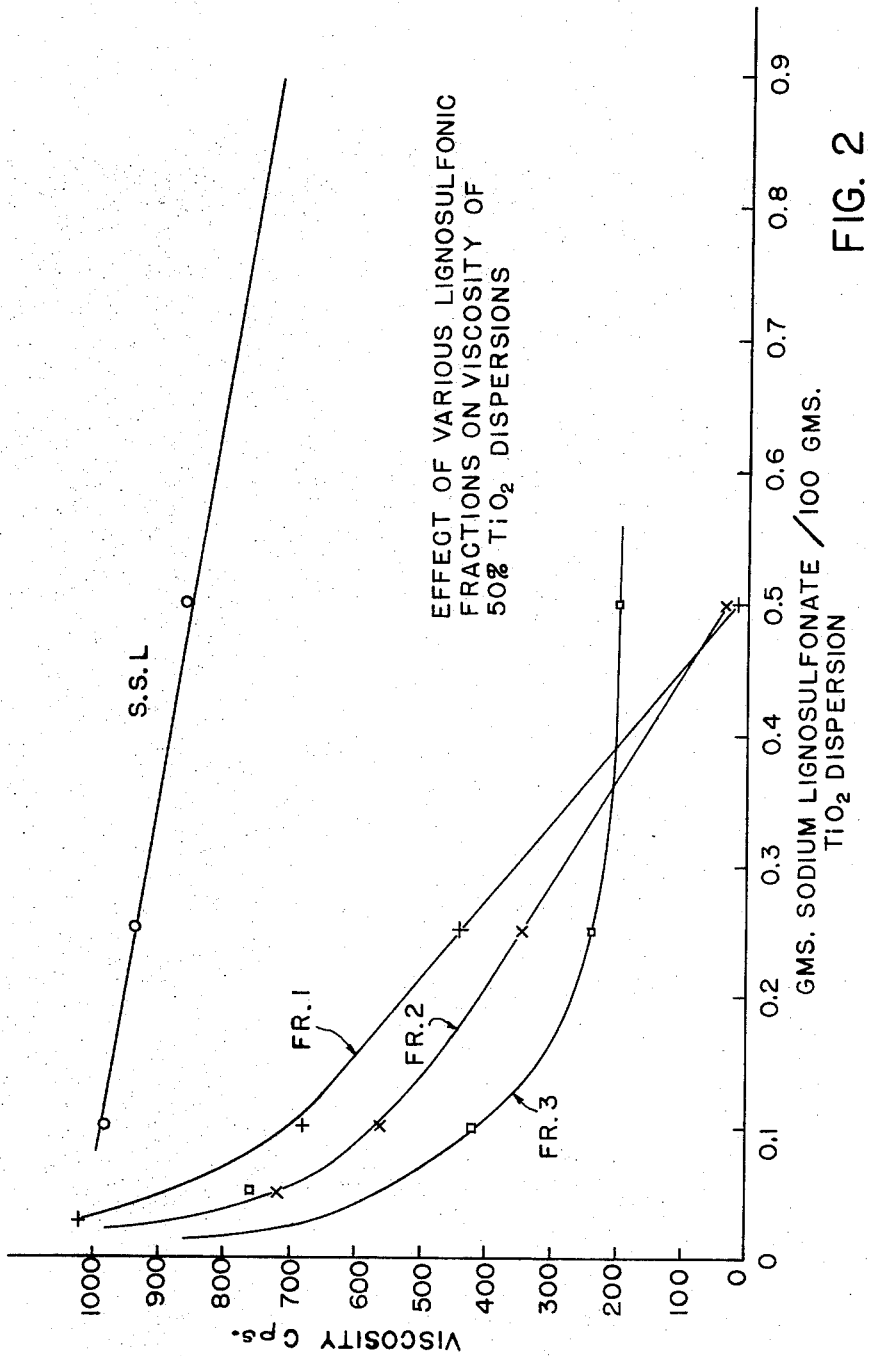

United States Patent Office 3,251,820
Patented May 17, 1966

3,251,820
PROCESS FOR THE FRACTIONAL EXTRACTION AND CONCENTRATION OF LIGNOSULFONIC ACIDS
Donald H. Grangaard, Appleton, Wis., assignor to Kimberly-Clark Corporation, Neenah, Wis., a corporation of Delaware
Filed Apr. 26, 1963, Ser. No. 275,941
6 Claims. (Cl. 260—124)

This invention relates to the fractionation and concentration of lignosulfonic acids.

Lignosulfonic acids and the lignosulfonates derivable from the acids have a plurality of widely differing uses. Such include utility as organic dispersants, as sources of vanillin, and as agents in tanning processes. The pulping of wood by the sulfite processes produces spent liquors which include these lignosulfonic acid components. These liquors also contain carbohydrates which may adversely influence the utility of the lignosulfonates. These carbohydrates, on the other hand, have greater utility in the production of alcohols, aldehydes and yeasts when separated from the lignosulfonic acids.

I have found that the lignosulfonic acids of spent sulfite liquor may be readily fractionally extracted to provide lignosulfonic acid products of varying relative acidity (neutral equivalent), sulfur content, and ability to produce vanillin. I have further found that concentration of the lignosulfonic acids may be effected to an extent that the solids content of the product obtained is 8 to 10 times the concentration of the lignosulfonate components of the original spent sulfite liquor. Also, the products are relatively pure and far more suitable for specific applications.

In addition, my process may be carried out in a relatively simple manner on a commercial basis if suitable precautions are taken with respect to the reagents involved.

It is, accordingly, a primary object of this invention to provide a novel process for the fractional extraction and concentration of lignosulfonic acids.

It is another object of this invention to provide a novel process for the attainment of useful products from the liquors of acid pulping processes and which, in essence, provides for greater utilization of wood.

An important object of this invention is to provide novel lignosulfonic acid products in an economical manner and in relatively high concentration.

In the practice of this invention the solution of relatively low solids content treated by fractional extraction procedures is an aqueous solution and contains the lignosulfonic acid components essentially in their free acid form. The treatment is effective to separate some of the lignosulfonic acid components into a nonaqeuous liquid phase which is essentially insoluble in the aqueous solution while the remainder of the lignosulfonic acids remain in the aqueous phase. The nonaqueous phase, when separated from the aqueous phase, is treated with a stripping agent to obtain the lignosulfonic acid components as a relatively concentrated aqueous solution while the fractional extraction treating agents are recoverable for reuse. It has been discovered that the first lignosulfonic acid components separated are low in relative acidity, low in percent sulfur, and low in vanillin producing ability. This first separated material is also more viscous. In contrast, the later separated fractions are higher in vanillin producing ability; higher in percent sulfur; and have higher apparent acidities.

The spent solutions of the various sulfite processes for pulping wood (acidic) contain the lignosulfonic acid components in quantity but such are not present in the free acid form. For the purpose of the present invention, to extract lignosulfonic components, conversion of the lignosulfonic acids to the free acid form in a pretreatment procedure is necessary. Additionally, other materials may be present such as free sulfur, sulfur dioxide, dissolved sulfates, metallic ions, and the like which may tend to interfere with the subsequent fractional extraction. Accordingly, such also should be removed or the effect of their presence minimized before extraction occurs.

In essence, the solution (pretreated if necessary) containing the lignosulfonic acids derived from a suitable source is first extracted with a quantity of a long chain aliphatic amine dissolved in an aliphatic alcohol which is essentially water insoluble. The amine-alcohol solution is restricted either in volume or concentration to react with only a portion of the lignosulfonic acids present. This results in the formation of an amine-lignosulfonic acid complex which is soluble in the alcohol but insoluble in the aqueous solution. The addition of the amine-alcohol solution thus causes the formation of two liquid phases, one an alcohol-organic phase containing the amine complex and the second an aqueous-organic phase containing the remaining lignosulfonic acids and the carbohydrate components of such liquors. I have found that, if the alcohol-organic phase is separated and treated with a relatively concentrated aqueous solution of a strong alkali, the amine-alcohol separates or is regenerated as a solution while the lignosulfonates dissolve in the aqueous phase, termed for convenience a second aqueous phase, and are in materially concentrated form. Thus, from dilute spent sulfite liquor with an initial sulfonic acid concentration of 5–6% lignosulfonic acids (pH about 0.9 to 1.5 and total solids 10–14%), a product which is essentially a solution of the alkali metal salt of pure lignosulfonic acids is readily attained. The solids content of this product is 30–60% by weight. Such solids contents are commercially useful, though, in general, solids contents of 45–55% are very satisfactory. Further, I have found that each successive fraction extracted, as described, can be obtained in as high or higher solids content as will be noted hereinafter.

Certain precautions must be observed for a procedure having good commercial utility. The liquid alcohol which serves as the carrier for the long chain amine must provide for solubility of the amine and the amine-lignosulfonic acid complex but must be essentially immiscible with an insoluble in water to avoid alcohol and amine losses. Preferably, the alcohol has a relatively low freezing or melting point in order to avoid solidification of the alcohol on cold surfaces. Such solidification not only renders the separation of the alcohol and aqueous phases difficult but, in addition, the solidified fraction tends to carry along with it abnormal quantities of water. I have found that alcohols of 8 to 16 carbon atoms such as octyl alcohol (F.P. −16° C.) iso-octyl alcohol and decyl alcohol are very suitable solvents for the purpose; all are available commercially and the latter are less expensive than the octyl providing an advantage where alcohol losses may occur. Cetyl alcohol, while useful and practically insoluble in water, has a somewhat higher melting point (49–50° C.) and consequently requires more care in handling; if permitted to solidify, this alcohol readily causes emulsion formation in the extraction step which results in difficulty of phase separation.

Curiously, I have found that emulsification may occur in the stripping step if the alkali solution added to the lignosulfonic acid-amine complex solution is of low concentration. The emulsion thus formed is highly stable and, in many instances, cannot be readily broken. Additionally, dilute alkali necessitates centrifuging to cause phase separation. In contrast, a relatively concentrated alkali solution (10–25% by weight) has the dual characteristic of preventing emulsion formation and providing a lignosulfonate phase of high solids content which separates readily on standing for a period of as low as 2–5 minutes. Suitable alkalies include sodium hydroxide, sodium carbonate, sodium bicarbonate, calcium hydroxide and calcium carbonate. Ammonium hydroxide may also be used. Its use, however, usually requires further treatment of the alcohol-amine solution before the latter can be reused for extraction purposes. The sodium hydroxide solution should contain about 10 to 25% NaOH by weight. Equivalent weights of other alkalies may be used.

Amines useful in the fractional extraction of the lignosulfonic acids include: decylamine, dodecylamine, 1-hydroxyethyl - 2 - heptadecenylglyoxadine, dicyclohexylamine, and tri-n-hexylamine. Secondary amines having substantially insolubility in aqueous solutions are available commercially. Substantial insolubility of the amine in aqueous solutions is desirable to avoid losses.

Where spent sulfite liquors (pH 4.5 to 6) of the papermaking process are employed, the extent of the pretreatment is dependent to some extent on the materials, particularly cations, present in the liquor and the tendency of such materials to interfere with the extraction of the lignosulfonic acids. The pre-treatment may be (a) passing the liquor through the hydrogen form of a cationic ion exchange resin; (b) electrodialysis of the liquor to remove cations; or (c) the addition of a mineral acid which is stronger than the lignosulfonic acids in order to convert the lignosulfonates to the free acid form. The latter process is suitable for commercial application and is preferred; it is effective with sulfite liquors whether they be of the calcium, magnesium, sodium, or ammonuim base without substantial process change.

In general, the pretreatment of the spent sulfite liquors to convert the lignosulfonic acids into the free acid form involves the addition of a strong mineral acid (i.e. $H_2SO_4$) to the spent sulfite liquor in an amount equivalent to the amount of bound lignosulfonic acids. I have found that an effective quantity for the purpose may be determined by the following procedure: (a) titrate an amount of the spent sulfite liquor with a standard alkali (0.1 N NaOH) using phenolphthalein as in the indicator; (b) pass an equivalent amount of the spent sulfite liquor through an ion exchange column in the hydrogen form (a Dowex 50 ion exchange column is suitable) and titrate the effluent with the same alkali (0.1 NaOH) with phenolnaphthalein as the indicator; (c) the amount of acid required is the difference between the two values; in fact, the acid quantity indicated is slightly in excess as the action on the ion exchange resin converts sulfites and sulfates of the liquor to acids also. Such excess is not harmful. The acid I prefer to employ is sulfuric acid. Other acids, for example, hydrochloric, may be used. The yields obtained when using this acid are inferior to that attained with sulfuric acid, however.

The sulfuric acid treatment when the cation of the solution is calcium is preferably accompanied by salt addition such as sodium sulfate, sodium carbonate, or sodium sulfite; in the case of the latter salts the salt addition precedes the acid addition. The precipitates which form are removed by filtration. Based in the ease of subsequent phase separation during the actual extraction step, I prefer to employ sulfuric acid followed by sodium sulfate. The quantity of sodium sulfate required varies with the extent of the presence of the calcium ion in the waste liquor; commonly, I have found that the addition of about 14 to 18 grams of sodium sulfate per liter of spent liquor is effective when the acid quantity is determined as set out above. Salts other than sodium sulfate may be employed—one such is calcium chloride.

The fractional extraction of the acids with the amine-alcohol solution may take place in a few or a great plurality of steps depending upon the characteristics desired in the final products. The total quantity of amine-alcohol employed is usually, but not necessarily, that sufficient to completely remove the lignosulfonic acid content of spent sulfite liquors. The incremental addition of this total quantity is effective to provide products of widely differing properties when as few as 3 extraction steps are practiced on the acid containing sulfite liquor. A large number of increments, however, serves to provide a wider variety of end products. The increments of the amine-alcohol solution are conveniently, though not necessarily, the same in volume and concentration. For commercial purposes I prefer that the concentration of the amine in the alcohol be relatively large; dilute solutions require larger equipment and large volumes to handle. A concentration of about 10–15% by weight of the amine in the alcohol is suitable.

For the purposes of aiding phase separation I have found that the temperatures in both the extractions with the amine-alcohol and the extractions with the alkali should be in the range of about 70–80° C. At lower temperatures to about 25° C. the procedure is operable but phase separation is more difficult. At higher temperatures the procedure is also operable.

The invention will be more fully understood by reference to the following detailed description including illustrative examples and the accompanying drawings wherein:

FIG. 1 is a diagrammatic illustration of the fluid flow in a three-step fractionation process; and FIG. 2 is a graph illustrating the effect of lignosulfonate fraction on the viscosity of titanium dioxide dispersions as compared with the effect of the original spent sulfite liquor on similar dispersions.

EXAMPLE I

Calcium base spent sulfite liquor from the digestion of spruce wood in pulping equipment to the extent of about 12,420 parts by weight (S.G. 1.0350) and having a total solids concentration of about 13.3% is acidified with $H_2SO_4$ (S.G. 1.84). For this purpose approximately 162 parts by weight of concentrated $H_2SO_4$ were required; additionally, 144 parts by weight of sodium sulfate were supplied and the batch was heated to a temperature of about 70–75° C. The pH of this batch was about 1.0. The time of heating was about ½ hour. As the batch was heated, a precipitate of calcium sulfate formed. This precipitate was filtered off at the end of the heating period.

The quantity of alcohol-amine solution necessary to effect complete solution of the lignosulfonic acids was about 11,344 parts by weight at a 15% concentration of the amine in the alcohol. The pH of the alcohol-amine is about 10. The specific amine for this example is dodecylamine dissolved in octyl alcohol. However, other amines including water insoluble secondary amines are commercially available and may be substituted for the dodecylamine with equivalent results.

The solution of the amine in the alcohol was added to the acidified liquor in 3 equal successive increments, each increment containing 600 cc. of the amine in 4,000 cc. of the alcohol. The temperature of the system was maintained at 70–75° C. After the addition of the first increment, followed by gentle agitation sufficient to provide intimate contact of the alcohol and aqueous phases without emulsion formation, the system was permitted to separate into the respective phases. The phases are an aqueous-organic phase containing the carbohydrates and some dissolved lignosulfonic acids and the alcohol-organic phase containing the amine-lignosulfonic acid complex dissolved in the alcohol. The upper or alcohol phase was now decanted from the lower or aqueous phase.

The decanted alcohol phase was then made alkaline by the mixing of about 296 parts by volume of a solution containing 250 parts by weight of sodium hydroxide per 1,000 parts by volume of water. The pH of the system is raised to about 9.5 by this addition, and the temperature of 70–75° C. is maintained in the system. The aqueous alkali causes the formation of an alcohol phase which contains the amine and a second aqeuous organic phase which contains the lignosulfonic components as sodium lignosulfonates. All of the lignosulfonic components separate from the alcohol phase and dissolve in this second aqueous phase. The lower specific gravity alcohol-amine phase was then separated by decantation from the aqueous product.

Similar fractions were provided by the extraction with two succeeding increments of the alcohol-amine; the third increment effectively freed the aqueous carbohydrate-containing solution of lignosulfonic components. This aqeuous solution then has utility in the production of yeast, alcohols, and the like.

The characteristics of the fractions were as follows:

*Table 1*

FRACTIONATION OF LIGNOSULFONIC ACIDS

| Fraction | Wt., g. | Percent Solids | N.E.[1] | Percent Sulfur | Vanillin Yield, g. per 100 g. of Lignin |
|---|---|---|---|---|---|
| 1 | 900.0 | 48.6 | 393 | 6.35 | 18.0 |
| 2 | 659.6 | 46.8 | 266 | 8.1 | 20.7 |
| 3 | 238.6 | 41.3 | 183 | 9.9 | 22.8 |

[1] N.E. designates the neutral equivalent.

Such fractions may be employed without further treatment or many be evaporated to dryness; the dried product readily disperses in aqueous media.

EXAMPLE II

The procedure of Example I was repeated: in this instance the weight of the waste sulfite liquor was 15,525 parts (S.G. 1.0350); the weight of $H_2SO_4$ was 213 parts (S.G. 1.84), and the weight of $Na_2SO_4$ 180 parts.

The weight of the amine-alcohol was 21,208 parts (25,800 cc.) and was added in 6 increments. Each increment contained 4,000 cc. of the alcohol and 300 cc. of the amine. The stripping agent was again a concentrated sodium hydroxide solution (25% NaOH by weight). Again all of the lignosulfonic components are separated from the amine-alcohol phase by the addition of the alkali and dissolve as salts of the alkali in the second aqueous phase.

The characteristics of the resulting lignosulfonate fractions were:

*Table 2*

FRACTIONATION OF LIGNOSULFONIC ACIDS

| Fraction | Wt., g. | Percent Solids | N.E.[1] | Percent Sulur | Vanillin Yield, g. per 100 g. of Lignin |
|---|---|---|---|---|---|
| 1 | 410 | 55.8 | 390 | 6.69 | 14.2 |
| 2 | 525.8 | 44.7 | 357 | 6.41 | 15.8 |
| 3 | 383.5 | 49.2 | 351 | 7.08 | 17.1 |
| 4 | 429.2 | 44.4 | 288 | 7.25 | 22.4 |
| 5 | 159.7 | 38.3 | 196 | 9.64 | 24.6 |
| 6 | 99.7 | 27.0 | 153 | 9.46 | 22.8 |

[1] N.E. designates the neutral equivalent.

From the foregoing it is seen that the neutral equivalent decreases with succeeding fractions and lower neutral equivalents are attained as the number of extractions is increased. The upper limit of the neutral equivalent for the spent sulfite liquor extraction is about 400; the minimum is dependent upon the number of extractions and the quantity of extraction agent employed in the increments.

Also, as may be seen from the data, the percent sulfur and the vanillin producing capacity of the fractions increases as the number of fractions is increased. Thus a clear fractionation of the lignosulfonic components is achieved.

The lignosulfonic acids in the product are present as sodium salts when sodium hydroxide is used as the stripping agent. Such salts, if desired, may be converted to the acid form by appropriate means as is necessary for the neutral equivalent determination.

While reference has been made in the specific illustrative examples to calcium base spent sulfite liquors, the procedure is applicable to magnesium, sodium, and ammonium base liquors also. However, no initial precipitate occurs upon acidification and filtering prior to the extraction is unnecessary.

Data on experiments in which sodium sulfite or sodium carbonate are employed for removing the calcium ions of calcium base liquors indicate no material change in product yield or quality.

Referring now to the drawing, the fluid flow for a semi-continuous extraction procedure for separation of the lignosulfonics into 3 fractions is illustrated. For convenience in identification, similar components of the flow diagram are designated with a common numeral followed by a characterizing letter where appropriate. Specific equipment details are not illustrated as suitable apparatus may be readily provided for the fractionation process.

The numeral 1 designates a first mixing tank into which the spent liquor of any acid pulping process or a solution of the lignosulfonic acid materials is fed at 2; sulfuric acid and sodium sulfate are added to mixing tank 1 at 3, 4 to convert the lignosulfonic acids to the free acid form. Precipitated material is withdrawn as a sludge by filter 5 as indicated at 6 while the effluent is passed through an outlet indicated at 7 to an extraction chamber 8a; a plurality of such extraction chambers are provided as shown at 8b and 8c.

An inlet designated at 9a provides for initial introduction of an amine-alcohol solution to the chamber 8a; after process initiation recirculation of the amine-alcohol recovered in the process provides this extraction agent except for slight losses which may be made up through the inlet 9a.

In the first extraction chamber 8a the lignosulfonic acids react and complex with the amine and the complex dissolves in the alcohol. The alcohol phase is insoluble in the aqueous phase which is heavier and settles.

The upper alcoholic solution is introduced through a conduit designated 10a to a stripping container 12a. The aqueous phase remaining in chamber 8a and which contains dissolved sugars including pentoses, hexoses, and also some of the lignosulfonic acids, is passed to extraction chamber 8b through an outlet indicated at 11a.

Alkali is introduced through inlet 13a to the extracted lignosulfonic acids in solution in the alcohol in container 12a. The alkali causes the lignosulfonic-amine complex to dissociate and the lignosulfonic acids are converted to salts soluble in the aqueous alkali phase; the alcohol-amine solution forms a separate lighter phase which is recirculated through outlet 14a to the extraction chamber 8a. The heavier aqueous phase is centrifuged at 15a to remove any entrained alcohol-amine and such is recirculated through outlet 16a to extraction chamber 8a. The aqueous solution containing the sodium salts of the lignosulfonic acids is drawn off through outlet 17a.

The residual liquor is then successively extracted at 8b, stripped at 12b, extracted at 8c, and stripped at 12c to provide the fractionated products at 17b and 17d. Cycling of recovered amine-alcohol solution is effected at 16b, 16c, and 16d as well as at 14b and 14c. The aqueous solution, freed of the lignosulfonic acids, is recovered at 15c where contrifuging takes place to remove traces of the amine-alcohol solution. The aqueous solution containing essentially sugars is withdrawn at 17c. The inlets designated 9b and 9c serve the same purpose as inlet 9a while inlets 13b and 13c serve the same purpose as inlet 13a.

Reference is now made to FIG. 2 wherein the effect of sodium lignosulfonate fractions designated FR. 1, FR. 2 and FR. 3 prepared in accordance with Example I are contrasted as to their dispersing effect against the original sulfite liquor designated S.S.L. The dispersing effect is analyzed through viscosity measurements of aqueous titanium dioxide dispersions or slurries wherein the titanium dioxide constitutes 50% by weight of the dispersion. As may be readily noted from FIG. 2, fraction 3 (Table 1) provides over the lower ranges of lignosulfonate concentration a materially lower viscosity than other fractions and very much lower than the original liquor. Additionally, a higher sodium lignosulfonate concentration is required in fractions 2 and 3 and the original spent sulfite liquor to secure a given viscosity. However, viscosity change with higher concentrations of the sodium lignosulfonate is disproportionately greater as the concentration increases in fractions 2 and 3.

Fraction 1 at a solids content of 45–55% is usually relatively viscous; the later fractions tend to be less viscous and solids content of as high as 60% may be procured by limiting the alkali solution volume added in the stripping step.

The liquors from a large number of acid wood pulping processes serve to produce the fractions indicated. Thus, liquors from such woods as spruce, hemlock and poplar are all useful.

The process of selective extraction described permits the recovery of considerable quantities of the lignosulfonates —about a ton of the 45–55% solids material per ton of pulp produced in the sulfite pulping process.

It will be understood that this invention is susceptible to modification in order to adapt to different usages and conditions and, accordingly, it is desired to comprehend such modifications within the invention as may fall within the scope of the appended claims.

What is claimed is:

1. A process for the fractional extraction and concentration of lignosulfonic acids which comprises the steps of:
   (a) extracting a dilute aqueous solution of lignosulfonic acids with a solution of a substantially water insoluble aliphatic amine in an aliphatic alcohol of 8 to 16 carbon atoms and which aliphatic alcohol is substantially insoluble in water to cause the formation of a first aqueous phase and an alcohol phase, the quantity of the alcohol-amine solution being sufficient to extract only a portion of the lignosulfonic acids from the aqueous solution;
   (b) removing the alcohol phase from the first aqueous phase;
   (c) adding to the alcohol phase, to form a second aqueous phase and to regenerate the alcohol-amine solution, a concentrated aqueous solution of a strong alkali to an extent whereby all of the lignosulfonic components separate from the alcohol phase and dissolve in the second aqueous phase as salts of the alkali, the concentration of the alkali being such that the separated aqueous phase has a solids content of at least 30% by weight;
   (d) removing the second aqueous phase from the alcohol-amine solution regenerated by the alkali addition; and
   (e) subsequently extracting other fractions as alkali salts of the lignosulfonic acids from the first aqueous phase solution.

2. A process for the fractional extraction and concentration of lignosulfonic acids which comprises the steps of:
   (a) extracting a dilute aqueous solution of lignosulfonic acids at a temperature of about 70–80° C. with a solution of a substantially water insoluble aliphatic amine in an aliphatic alcohol of 8 to 16 carbon atoms and which aliphatic alcohol is substantially insoluble in water to cause the formation of a first aqueous phase and an alcohol phase, the quantity of the alcohol-amine solution being sufficient to extract only a portion of the lignosulfonic acids from the aqueous solution;
   (b) removing the alcohol phase from the first aqueous phase;
   (c) adding, while maintaining the temperature of about 70°–80° C., to the alcohol phase to form a second aqueous phase and to regenerate the alcohol-amine solution, a concentrated aqueous solution of a strong alkali to an extent whereby all of the lignosulfonic components separate from the alcohol phase and dissolve in the second aqueous phase as salts of the alkali, the concentration of the alkali being such that the separated aqueous phase has a solids content of at least 30% to 60% by weight;
   (d) removing the second aqueous phase from the alcohol-amine solution regenerated by the alkali addition; and
   (e) subsequently extracting other fractions as alkali salts of the lignosulfonic acids from the first aqueous phase solution.

3. A process for the fractional extraction and concentration of lignosulfonic acids which comprises the steps of:
   (a) extracting a dilute aqueous solution of lignosulfonic acids at a temperature of about 70–80° C. with a solution of a substantially water insoluble aliphatic amine in an aliphatic alcohol of 8 to 16 carbon atoms and which aliphatic alcohol is substantially insoluble in water to cause the formation of a first aqueous phase and an alcohol phase, the quantity of the alcohol-amine solution being sufficient to extract only a portion of the lignosulfonic acids from the aqueous solution;
   (b) removing the alcohol phase from the first aqueous phase;
   (c) adding, while maintaining the temperature of about 70–80° C., to the alcohol phase to form a second aqueous phase and to regenerate the alcohol-amine solution, a concentrated aqueous solution of a strong alkali having an alkali concentration equivalent to 10 to 25% by weight of sodium hydroxide whereby all of the lignosulfonic components separate from the alcohol phase and dissolve in the second aqueous phase as salts of the alkali, the concentration of the alkali being such that the separated aqueous phase has a solids content of at least 30% to 60% by weight;
   (d) removing the second aqueous phase from the alcohol-amine solution regenerated by the alkali addition; and
   (e) subsequently extracting other fractions of alkali salts of the lignosulfonic acids from the first aqueous phase solution.

4. A process for the fractional extraction and concentration of lignosulfonic acids which comprises the steps of:
   (a) extracting a dilute aqueous solution of lignosulfonic acids at a temperature of about 70–80° C., with a solution of a substantially water insoluble aliphatic amine in an aliphatic alcohol of 8 to 16 carbon atoms and which aliphatic alcohol is substantially insoluble in water to cause the formation of a first aqueous phase and an alcohol phase, the quantity of the alcohol-amine solution being sufficient to extract only a portion of the lignosulfonic acids from the aqueous solution;
   (b) removing the alcohol phase from the first aqueous phase;
   (c) adding to the alcohol phase to form a second aqueous phase and to regenerate the alcohol-amine solution, a concentrated aqueous solution of a strong alkali having an alkali concentration equivalent to 10 to 25% by weight of sodium hydroxide whereby all of the lignosulfonic components separate from the alcohol phase and dissolve in the second aqueous phase as salts of the alkali, the concentration of the alkali being such that the separated aqueous phase has a solids content of at least 30% to 60% by weight;
(d) maintaining the temperature of the alcohol phase-aqueous phase system at about 70–80° C., at least until the phases separate;
(e) removing the second aqueous phase from the alcohol-amine solution regenerated by the alkali addition; and
(f) subsequently extracting at least two other fractions as alkali salts of the lignosulfonic acids from the first aqueous phase solution.

5. A process for the fractional extraction and concentration of lignosulfonic acids which comprises the steps of:
(a) extracting a dilute aqueous solution of lignosulfonic acids with a solution of a substantially water insoluble aliphatic amine in an aliphatic alcohol selected from the group of alcohols consisting of octyl alcohol, iso-octyl alcohol, decyl alcohol and cetyl alcohol to cause the formation of a first aqueous phase and an alcohol phase, the quantity of the alcohol-amine solution being sufficient to extract only a portion of the lignosulfonic acids from the aqueous solution;
(b) maintaining the temperature of the system of phases above 70° C. while carrying out the extraction;
(c) removing the alcohol phase from the first aqueous phase;
(d) adding to the alcohol phase, to form a second aqueous phase, and to regenerate the alcohol-amine solution, a concentrated aqueous solution of a strong alkali having an alkali concentration equivalent to 10 to 25% by weight of sodium hydroxide whereby all of the lignosulfonic components separate from the alcohol phase and dissolve in the second aqueous phase as salts of the alkali, the concentration of the alkali being such that the separated aqueous phase has a solids content of at least 30% to 60% by weight;
(e) maintaining the temperature of the alcohol phase-second aqueous phase system above 70° C. at least until the phases separate;
(f) removing the second aqueous phase from the alcohol-amine solution regenerated by the alkali addition; and
(g) subsequently extracting at least two other fractions as alkali salts of the lignosulfonic acids from the first aqueous phase solution.

6. A process for the fractional extraction and concentration of lignosulfonic acids which comprises the steps of:
(a) acidifying spent sulfite liquor to a pH in the range of about 0.9 to 1.5 to convert lignosulfonate components to lignosulfonic acids;
(b) filtering out any precipitate which forms;
(c) extracting the aqueous solution containing the lignosulfonic acids at a temperature of 70–80° C. with a solution of a substantially water insoluble aliphatic amine in a primary aliphatic alcohol of 8 to 16 carbon atoms and which aliphatic alcohol is substantially insoluble in water to cause the formation of a first aqueous phase and an alcohol phase, the quantity of the alcohol-amine solution being sufficient to extract only a portion of the lignosulfonic acids from the aqueous solution;
(d) removing the alcohol phase from the first aqueous phase;
(e) adding, while maintaining the temperature of 70–80° C., to the alcohol phase, to form a second aqueous phase and to regenerate the alcohol-amine solution, a concentrated aqueous solution of a strong alkali whereby all of the lignosulfonic components separate from the alcohol phase and dissolve in the second aqueous phase as salts of the alkali, the concentration of the alkali being 10 to 25% by weight of the aqueous alkali solution and the aqueous alkali solution quantity such that the separated aqueous lignosulfonic acid phase has a solids content of 30% to 60% by weight;
(f) removing the second aqueous phase from the alcohol phase; and
(g) subsequently extracting other fractions of the lignosulfonic acids.

References Cited by the Examiner
UNITED STATES PATENTS
2,699,998   1/1955   Morton _____ 260—124 X FOREIGN PATENTS
196,239   3/1958   Austria.

CHARLES B. PARKER, *Primary Examiner.*